United States Patent [19]

Southgate

[11] Patent Number: 4,547,809
[45] Date of Patent: Oct. 15, 1985

[54] THERMALLY ISOLATED IMAGER

[75] Inventor: Peter D. Southgate, Princeton, N.J.

[73] Assignee: RCA Corporation, Princeton, N.J.

[21] Appl. No.: 604,974

[22] Filed: Apr. 27, 1984

[51] Int. Cl.[4] ............................................. H04N 9/09
[52] U.S. Cl. .................................... 358/229; 358/213
[58] Field of Search .............. 358/212, 213, 229, 221; 361/424

[56] References Cited

U.S. PATENT DOCUMENTS

| | | | |
|---|---|---|---|
| 4,142,207 | 2/1979 | McCormack | 358/213 |
| 4,194,220 | 3/1980 | Frame | 358/221 |
| 4,369,459 | 1/1983 | Iwasawa | 358/213 |

*Primary Examiner*—Thomas W. Brown
*Assistant Examiner*—L. C. Schroeder
*Attorney, Agent, or Firm*—Eugene M. Whitacre; William H. Meise; Lawrence C. Edelman

[57] ABSTRACT

A portable television camera comprises a relatively small housing including a solid-state imager for generating image-representative signals, and signal processing circuitry coupled to the imager for generating a video signal from the image representative signals. The noise performance of the solid-state imager is degraded by a temperature rise within the small housing caused by the heat generated from the signal processing circuitry. A thermal isolation is used for dividing the housing into a first part including the solid-state imager and a second part, isolated from the first part, which is associated with the heat generating signal processing circuits.

6 Claims, 2 Drawing Figures

THERMALLY ISOLATED IMAGER

This invention relates to low-noise solid state imager cameras and more particularly, to thermal isolation for reducing the operating temperature of such imagers in television cameras for improving noise performance.

Portable television cameras are widely used for electronic news gathering (ENG) purposes. These cameras are used under adverse lighting conditions and in field situations in which battery operation is required. Until recently, tube-type cameras were used exclusively for ENG applications. Tube-type cameras are disadvantageous because of their relatively large size, their sensitivity to physical shock, their high power drain resulting from the requirement for thermal heaters for activating the cathodes of the tubes, and because the heat generated by the tube may adversely affect the environmental conditions for the solid-state processing which, in a portable camera, is located close to the tube. With the advent of solid-state imagers such as charge coupled device (CCD) imagers, the disadvantages of size and sensitivity to physical shock have been eliminated. Furthermore, the power drain of CCD imagers is much lower than that of tube-type imagers. Additionally, solid-state imagers have inherent noise mechanisms which allow operation at light levels which are generally lower than those for tube-type imagers.

The noise mechanisms of solid-state imagers (such as the temperature-dependent dark current) are such that operation at room temperature provides good noise performance under ordinary lighting conditions. However, the noise performance may not be satisfactory under low light level conditions, such as may be experienced when televising night scenes or indoor scenes under ambient lighting. It is known to use thermoelectric coolers for cooling the solid-state imagers of an ENG camera to reduce the effects of temperature-dependent noise under low-light conditions. However, some of the advantages of the solid-state imager over the tube-type imager are lost when cooling is used. For example, the additional power required for the cooler increases the power drain on the power supply for the camera. Since the camera is portable and ordinarily operated from batteries, the battery life is thereby shortened and the camera operating time inconveniently reduced.

It has been discovered by the present inventor that the performance of the solid-state imager is adversely affected by the heat generated by the signal processing circuits of a portable television camera, due to the close proximity of these circuits to the camera imager. This is an unexpected result, since tube-type cameras have not had their performance adversely affected by the heat generated from the signal processing circuits. It is believed that this is because tube type imagers are much less sensitive than solid-state imagers to the relatively small amount of heat generated from the signal processing circuits. Furthermore, the signal processing circuits dissipate a much larger power than the power dissipated by the solid-state imagers, and the temperature rise occasioned by the power dissipation of the signal processing circuits causes a relatively large percentage temperature rise of the imagers. This, coupled with the relatively great sensitivity of solid-state imagers to temperature-dependent dark current and other noise sources, results in degradation of the image generated by noise attributable to the presence of the power-dissipating signal processing circuits.

Even when a thermoelectric cooler is used to reduce the imager temperature, the presence of heat from the signal processing circuits raises the base temperature from which the cooling must be started. Greater power is therefore required to be supplied to the thermoelectric cooler to provide the additional cooling required to overcome the temperature rise occasioned by the power dissipation of the signal processing circuits. Conventional ways to avoid the problems occasioned by the heat given off from the signal processing circuits would include modification of the camera housing by increasing its size, such that the imagers can be located further from the signal processing circuits, or by the use of additional heat sinks and cooling fins. Furthermore, a larger thermoelectric cooler or a fan could be added to the camera. These solutions, however, are not practical for a portable camera since they disadvantageously increase its size, weight and/or decrease battery operating life, due to increased power drain.

SUMMARY OF THE INVENTION

A portable television camera has a housing which is small. At one end of the housing are located solid-state imagers having performance characteristics which are sensitive to temperature. Also within the housing are power-dissipating signal processing circuits. The power dissipated by the signal processing circuits raises the ambient temperature in the vicinity of the signal processing circuits and, due to thermal conduction within the housing, in the vicinity of the imagers. Power is removed from the camera by conduction and convection to and dissipation from the outer surface of the housing. In order to improve the performance characteristics of the camera, a thermal barrier is interposed within the camera housing between the power dissipating signal processing circuits and the imagers, whereby the thermal conductive paths are readjusted so that the imagers are in a lower ambient temperature than the signal processing circuits.

DESCRIPTION OF THE INVENTION

Figure 1:
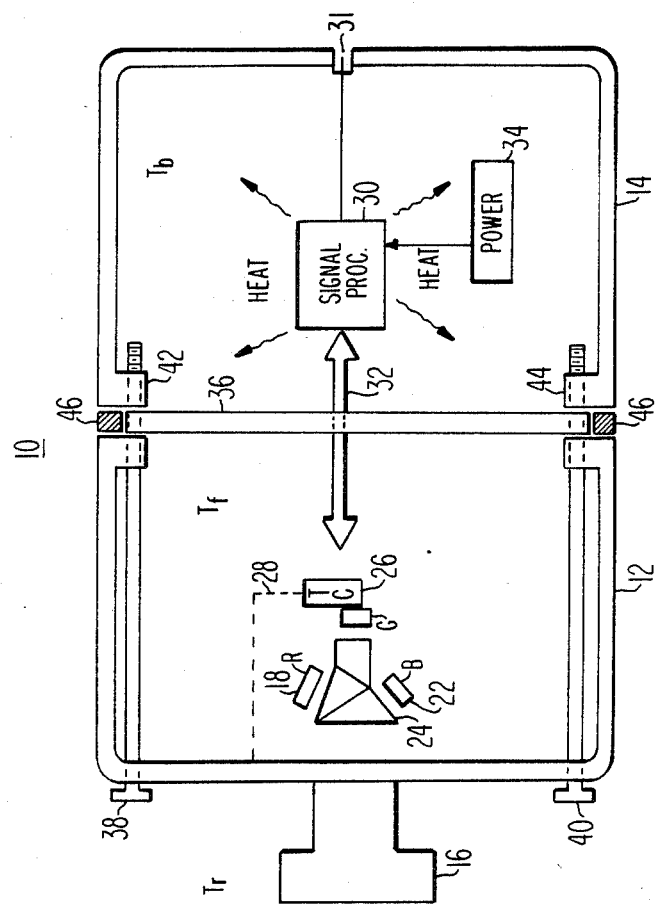
FIG. 1 illustrates a television camera in accordance with the invention.

In FIG. 1, a portable television camera 10 is shown including a housing or camera body having a front portion 12 and a rear portion 14. A lens 16 is mounted on front portion 12 for focussing a scene (not shown) onto the surfaces of a red-responsive solid-state imager 18, a green-responsive solid-state imager 20 and a blue-responsive solid-state imager 22, positioned at the light output ports of a color splitting prism 24. A thermoelectric cooler 26 of conventional type contacts green imager 20 for pumping heat away from imager 20 and to camera body 12 via a heat conducting path, such as a copper braid, illustrated by dashed line 28. Cooler 26 reduces the temperature of green imager 20, which ordinarily produces the largest color component of a color video signal, for improving the noise performance of camera 10. Although camera 10 includes a thermoelectric cooler, thermoelectric cooling may not be required in a camera constructed in accordance with the principles of the present invention.

The rear portion 14 of camera 10 includes signal processing circuitry 30 which generates clocking signals for operating imagers 18, 20 and 22 and for operation of thermoelectric cooler 26. The signals clocked from imagers 18, 20 and 22 are applied to signal processing circuitry 30, which may include black level correction, clamps, shading, gamma correction, matrixing circuits and other types of standard signal processing for generating R, G and B signals. Furthermore, signal processing circuitry 30 may include matrix and encoding circuitry for generating Y, I and Q signals which can be combined in a conventional manner for forming a composite signal such as an NTSC or PAL signal which is applied to an output terminal 31 of camera 10. The coupling of clocking signals, operating voltages and control signals to imagers 18, 20 and 22 and thermoelectric cooler 26 and the coupling of the output signals from these imagers to signal processing circuitry 30 is via a multiple conductor 32. A power supply 34 supplies operating voltage to signal processing circuitry 30 for energizing imagers 18, 20, and 22, cooler 26 and signal processing circuitry 30. For illustrative purposes, camera portions 12 and 14 are shown as being of approximately equal size, however, in practice, portion 12 is generally substantially smaller than portion 14.

As previously noted, the noise performance of solid-state imagers is particularly sensitive to their ambient temperature. Thus, thermoelectric cooler 26 is associated with green imager 20 for improving its noise performance. However, in a portable television camera it may be impractical to include thermoelectric coolers for each of the imagers. In fact, it may be desirable to include no thermoelectric coolers for the imagers since the coolers place a power drain upon the camera's batteries which shorten the operating life of the battery. Furthermore, signal processing circuitry 30 generates a significant amount of heat within camera 10 which raises the ambient temperature within the housing such that the noise performance of the solid-state imager is degraded.

In accordance with the principles of the present invention, a thermal barrier 36 is interposed between camera housing portions 12 and 14 for disrupting the thermal path of the heat generated from signal processing circuitry 30 to the solid-state imagers. Thermal barrier 36 is placed between housing portions 12 and 14 for separating the interior of camera 10 into front and rear portions. Barrier 36 is held in place by bolts 38 and 40 which pass from the front of camera 10 through portion 12, thermal barrier 36 and thread into flanged portions 42 and 44 of rear portion 14. A relatively rigid thermal insulating material 46 is placed as a gasket around the periphery of the junction between camera portions 12 and 14 for preventing any substantial deformation of thermal barrier 36 when portions 12 and 14 are joined by bolts by 38 and 40. Bolts 38 and 40 have a relatively small cross-sectional area and are made of stainless steel in order that they exhibit a relatively low thermal conductivity.

Figure 2:
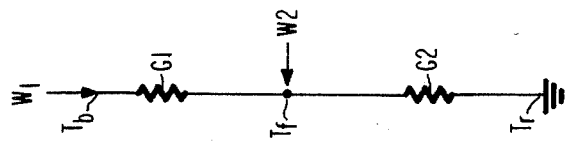
FIG. 2 is a schematic diagram of an electrical analog of the thermal circuit of the camera of FIG. 1.

FIG. 2 illustrates an electric circuit analogy which is useful in understanding the heat conduction within camera 10. In this electrical analogy, temperature T is represented by voltage, heat energy W is represented by electrical current and thermal conductance G is representative of 1/electrical resistance. A series connection of two resistors G1 and G2 represents the thermal conductances associated with the ambient temperature $T_f$ in front portion 12 which houses the television imagers. The thermal conductance between camera portions 12 and 14 is illustrated by the first series resistor G1. The thermal conductance of front portion 12 from the inside to the outside of the camera (by dissipation through the walls of camera portion 12) is represented by the second series resistor G2. One end of resistor G2 is at a reference temperature corresponding to the outside temperature of camera 10 and is labelled as room temperature $T_r$ and provided with an electrical ground symbol. The junction between conductance G1 and G2 corresponds to the ambient temperature $T_f$ inside front portion 12. Additionally, power $W_2$ applied at this junction is representative of the heat flow within portion 12 generated by operation of imagers 18, 20 and 22 and thermoelectric cooler 26. $T_b$ is representative of the temperature in the back portion 14 of the camera. Power $W_1$ which is representative of the heat flow from the back portion 14 of the camera into front portion 12, flows through conductance G1 as a consequence of temperature drop $T_b - T_f$. Analysis of this model yields the following equation for the temperature difference or rise $T_f - T_r$ of the front portion of the camera above outside ambient temperature:

$$T_f - T_r = \frac{W_2 + G1(T_b - T_r)}{G1 + G2}$$

Using this equation, the effect of the thermal barrier of the invention can be calculated. Referring to the exemplary camera of FIG. 1, front case conductance G2 is assumed to be 0.45 W/°C. (watts per degree centigrade), and front-to-back case conductance G1 equals 0.225 W/°C. (the sum of the conductances for the bolts 38 and 40, which is 0.035 W/°C., of thermal barrier 36 which comprises one-half inch thick foam, having a conductance of 0.13 W/°C. and that of relatively stiff gasket 46 which is 0.06 W/°C.). Assuming that the camera back case temperature $T_b$ is 20° above the room temperature and that the total power dissipated in the front case is 1.5 watts, solving the above equation results in a temperature $T_f$ which is 8.9° above the room temperature, or stated another way, the temperature of the front of the camera is maintained 11.1° lower than the temperature in the back of camera. Since the temperature-dependent dark current of a solid-state imagers approximately doubles for every 10° C. increase in temperature, in the above example the thermal barrier provided in accordance with the present invention resulted in a 100% improvement in dark current noise performance.

While the invention has been described in terms of a preferred embodiment, it is to be understood that further modifications may now suggest themselves to those skilled in the art and it is intended that the invention includes such modifications as they fall within the scope of the following claims. For example, back portion 14 may also include a video recorder for recording the composite color signal on video tape. Each of imagers 18, 20 and 22 may be thermo-electrically cooled or, if desired, none of the imagers may be cooled. Also, camera portions 12 and 14 could be fastened by means other than by stainless steel bolts, such as nylon or other low thermal conductive material bolts, screws or even an adhesive. Although a relatively rigid gasket 46 is used between the peripheries of camera portions 12 and 14, gasket 46 can be eliminated and the cross-sectional area of barrier 36 can be increased to compensate for the elimination of gasket 46. Furthermore, materials other than one-half inch thick foam are suitable for forming thermal barrier 36. Finally, for preventing radiant energy from entering portion 12, the side of barrier 36 facing signal processing circuits 30 may be metalized. Such metalization may also be useful for reducing leakage of electromagnetic radiation from the camera.

What is claimed is:

1. An improved television camera comprising:
    solid-state imaging means for generating image-representative signals in response to radiant energy received from a scene;
    signal processing means electrically coupled to said imaging means for generating video signal from said image representative signals;
    energization means coupled to said imaging means and said signal processing means for energization thereof; and
    a camera housing for supporting and enclosing said imaging means, signal processing means and said energization means, wherein the energization of said signal processing means generates heat causing a temperature rise within said housing which is sufficient to degrade the noise performance of said imaging means, the improvement comprising:
    thermal isolation means forming a thermal barrier in said housing for dividing said housing into a first portion associated with said imaging means and a second portion associated with said signal processing and energization means, thereby reducing the thermal coupling of heat from said second to said first housing portions and resulting in a lower temperature in said first portion and consequently an improved noise performance for said imaging means.

2. A television camera according to claim 1, wherein said thermal isolation means comprises a thermal insulating barrier having a predetermined thickness and a periphery in contact with the interior periphery of said housing.

3. A television camera according to claim 2, wherein said insulating material comprises a solid polymer foam.

4. A television camera according to claim 3, wherein said predetermined thickness has an order of magnitude of one-half inch.

5. A television camera according to claim 2 including an additional thermal insulating barrier of a material substantially less compressible than said first-mentioned thermal insulating barrier, said additional thermal insulating barrier being sandwiched between the peripheries of said first and second housing portions so as to serve as a gasket between said housing portions.

6. A television camera comprising:
    solid-state imaging means for generating image-representative signals in response to radiant energy received from a scene;
    signal processing means electrically coupled to said imaging means for generating video signal from said image representative signals;
    energization means coupled to said imaging means and said signal processing means for energization thereof;
    a camera housing for supporting and enclosing said imaging means, signal processing means and said energization means; and
    thermal isolation means forming a thermal barrier in said housing for dividing said housing into a first portion associated with said imaging means and a second portion associated with said signal processing and energization means, said thermal isolation means comprising a first thermal insulating barrier having a predetermined thickness and a periphery in contact with the interior periphery of said housing and a second thermal insulating barrier of a material substantially less compressible than said first thermal insulating barrier said second thermal insulating barrier being sandwiched between the peripheries of said first and second housing portions so as to serve as a gasket between said housing portions.

* * * * *